(12) United States Patent
Yseboodt et al.

(10) Patent No.: US 10,313,138 B2
(45) Date of Patent: Jun. 4, 2019

(54) POWERED DEVICE AND POWER DISTRIBUTION SYSTEM COMPRISING THE POWERED DEVICE

(71) Applicant: SIGNIFY HOLDING B.V., Eindhoven (NL)

(72) Inventors: Lennart Yseboodt, Retie (BE); Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 74 days.

(21) Appl. No.: 14/907,678

(22) PCT Filed: Jul. 25, 2014

(86) PCT No.: PCT/EP2014/065989
§ 371 (c)(1),
(2) Date: Jan. 26, 2016

(87) PCT Pub. No.: WO2015/018656
PCT Pub. Date: Feb. 12, 2015

(65) Prior Publication Data
US 2016/0164688 A1 Jun. 9, 2016

(30) Foreign Application Priority Data

Aug. 8, 2013 (EP) ..................... 13179716

(51) Int. Cl.
*H04L 12/10* (2006.01)
*H05B 37/02* (2006.01)
*G06F 1/26* (2006.01)

(52) U.S. Cl.
CPC .............. *H04L 12/10* (2013.01); *G06F 1/266* (2013.01); *H05B 37/0254* (2013.01)

(58) Field of Classification Search
CPC ..... G06F 1/266; H05B 37/0254; H04L 12/10; Y10T 307/549; Y10T 307/555;
(Continued)

(56) References Cited

U.S. PATENT DOCUMENTS

2006/0112288 A1 5/2006 Schindler
2006/0149978 A1 7/2006 Randall et al.
(Continued)

FOREIGN PATENT DOCUMENTS

EP  1612941 A1  4/2006
WO  2011055284 A2  5/2011
(Continued)

OTHER PUBLICATIONS

"Data Terminal Equipment (DTE) Power Via Media Dependent Interface (MDI)," IEEE Standard for Ethernet, IEEE STD 802.3, 2012 (94 Pages).

*Primary Examiner* — Patrick C Chen
(74) *Attorney, Agent, or Firm* — Meenakshy Chakravorty

(57) ABSTRACT

The invention relates to a powered device (2) like a luminaire for being used in a power distribution system (100), which is preferentially a PoE system and which comprises a power sourcing device (1) for sourcing a power to the powered device. The powered device comprises an electrical load like an LED and an electrical load power providing unit for generating from the sourced power an electrical load power and for providing the electrical load power to the electrical load, wherein the electrical load power providing unit is adapted to generate the electrical load power with a power level such that an input current drawn by the powered device from the power sourcing device is maximized below a predefined upper input current threshold. This allows increasing the power consumption of the powered device in comparison to the power consumption of powered devices in accordance with the PoE standard IEEE 802.3at.

17 Claims, 6 Drawing Sheets

(58) Field of Classification Search
CPC .............. Y10T 307/56; Y10T 307/565; Y10T 307/571; Y10T 307/576; Y10T 307/582; Y10T 307/587; Y10T 307/593; Y10T 307/604; Y10T 307/609
USPC .......................................................... 307/1
See application file for complete search history.

(56) References Cited

U.S. PATENT DOCUMENTS

| | | | |
|---|---|---|---|
| 2006/0164769 A1* | 7/2006 | Stanford | H04L 12/10 361/87 |
| 2006/0166706 A1 | 7/2006 | Dwelley et al. | |
| 2007/0220280 A1* | 9/2007 | Karam | H04L 12/10 713/300 |
| 2008/0052546 A1 | 2/2008 | Schindler et al. | |
| 2008/0215899 A1 | 9/2008 | Jonnala et al. | |
| 2010/0320183 A1* | 12/2010 | Borchert | B23K 9/1006 219/130.1 |
| 2012/0092811 A1* | 4/2012 | Chapel | H04L 12/10 361/622 |
| 2013/0061079 A1* | 3/2013 | Kataoka | G06F 3/1229 713/323 |
| 2013/0169316 A1* | 7/2013 | Lee | H04L 5/16 327/108 |

FOREIGN PATENT DOCUMENTS

| | | |
|---|---|---|
| WO | 2011057255 A2 | 5/2011 |
| WO | 2013012411 A1 | 1/2013 |

* cited by examiner

POWERED DEVICE AND POWER DISTRIBUTION SYSTEM COMPRISING THE POWERED DEVICE

CROSS-REFERENCE TO PRIOR APPLICATIONS

This application is the U.S. National Phase application under 35 U.S.C. § 371 of International Application No. PCT/EP2014/065989, filed on Jul. 25, 2014, which claims the benefit of European Patent Application No. 13179716.9, filed on Aug. 8, 2013. These applications are hereby incorporated by reference herein.

FIELD OF THE INVENTION

The present invention relates to a powered device for being used in a power distribution system, the system comprising a power sourcing device for sourcing a power to the powered device and an electrical conductor connected to the power sourcing device and the powered device for conveying the sourced power along with data between the power sourcing device and the powered device. The present invention further relates to a power distribution system comprising the powered device, and to a method and computer program for providing an electrical load power to an electrical load of the powered device.

BACKGROUND OF THE INVENTION

In Power-over-Ethernet (PoE) systems in accordance with the PoE standard IEEE 802.3at, a power sourcing device (power sourcing equipment; PSE) sources a power to one or several powered devices (PD) via one or several Ethernet cables. The power sourcing device is, e.g., a switch and the powered devices are, e.g., security cameras, wireless access points, VoIP telephones, etc. In accordance with the standard, the power consumption of the powered devices is limited to only a comparably small power level, which is smaller than the power level sourcable by each port of the power sourcing device, in order to compensate for possible losses in the Ethernet cables.

US 2006/0164769 A1 discloses a system and methodology for adjusting a current limit threshold in a PoE system in accordance with requirements of a PD. A system for supplying power to a PD over a communications link has a requirement determining circuit for determining a PD's requirement, and a control circuit for setting a parameter restricting an output signal of the PSE in accordance with the determined PD's requirement. The control circuit may set a current limit threshold of the PSE and/or the PD in accordance with the determined PD's requirement, such as a power requirement.

SUMMARY OF THE INVENTION

It is an object of the present invention to provide a powered device for being used in a power distribution system, such as a PoE system, which can have a larger power consumption. It is a further object of the present invention to provide a power distribution system comprising the powered device, and a method and computer program for providing an electrical load power to an electrical load of the powered device.

In a first aspect of the present invention, a powered device for being used in a power distribution system is presented, the system comprising a power sourcing device for sourcing a power to the powered device and an electrical conductor connected to the power sourcing device and the powered device for conveying the sourced power along with data between the power sourcing device and the powered device, wherein the powered device comprises:
an electrical load, and
an electrical load power providing unit for generating from the sourced power an electrical load power and for providing the electrical load power to the electrical load, wherein the electrical load power providing unit is adapted to generate the electrical load power with a power level such that an input current drawn by the powered device from the power sourcing device is maximized below a predefined upper input current threshold, allowing the powered device to consume more power than allowed to the powered device according to a negotiated power class.

Since the powered device comprises an electrical load power providing unit that generates the electrical load power with a power level such that the input current drawn by the powered device from the power sourcing device is maximized below a predefined upper input current threshold, the electrical load power and, thus, the power consumption of the powered device can be maximized within the limits resulting from the upper input current threshold. This allows for an increase of the power consumption of the powered device.

The power distribution system is preferentially a PoE system, wherein the power sourcing device and the powered device are PoE devices and the electrical conductor is an Ethernet cable, such as a CAT5 (Category 5) or a CAT6 (Category 6) cable. The power sourcing device, which can also be regarded as being a PSE, may be an endspan device, such as a switch, or a midspan device, such as a PoE injector.

In an embodiment, the powered device comprises a current determining unit for determining a current flowing in the powered device, wherein the electrical load power providing unit is adapted to generate the electrical load power based on the determined current. In particular, the current determining unit may be adapted to determine the current using a low side current sense. As an alternative, the current determining unit may also be adapted to determine the current using a high side current sense. In another alternative, the current determining unit may also comprise a Hall sensor for determining a current flowing in the powered device.

In an embodiment, the powered device comprises a voltage determining unit for determining a voltage present in the powered device, wherein the electrical load power providing unit is adapted to generate the electrical load power with incrementally increasing power levels until it detects from the determined voltage that the powered device reduces the voltage present at the powered device in order to protect from an overcurrent.

In an embodiment, the powered device comprises a communication unit for communicating with the power sourcing device via the electrical conductor, wherein the communication unit is adapted to request from the power sourcing device an information about the drawn input current, wherein the electrical load power providing unit is adapted to generate the electrical load power based on the requested information.

In an embodiment, the electrical load power providing unit is adapted to generate the electrical load power with incrementally increasing power levels and to record, for each increment, a power generation setting corresponding to the respective power level in a non-volatile memory unit until the powered device is cut-off by the power sourcing device in order to protect from an overcurrent, wherein the electrical load power providing unit is further adapted to generate, after the powered device has been restarted in reaction to the cut-off, the electrical load power with a power generation setting corresponding to a power level that is slightly below the power level that caused the cut-off.

In an embodiment, the electrical load power providing unit comprises an electrical load driver for generating from the sourced power the electrical load power and for providing the electrical load power to the electrical load, and an electrical load power controller for determining the power level of the electrical load power such that the drawn input current is maximized below the predefined upper input current threshold and for sending a control signal being indicative of the determined power level to the electrical load driver, wherein the electrical load driver is adapted to generate the electrical load power from the sourced power in accordance with the power control signal. The electrical load driver is preferentially adapted to generate the electrical load power by generating a corresponding electrical load driving current for driving the electrical load. The electrical load power providing unit may be adapted to low pass filter the power control signal.

In an embodiment, the powered device comprises a first voltage determining unit for determining a first voltage present at the electrical load power providing unit, a second voltage determining unit for determining a second voltage present at the electrical load, wherein the electrical load power providing unit is adapted to generate the electrical load power based on the determined second voltage, a predetermined first information relating the determined second voltage to a corresponding power level of the electrical load power, a predetermined second information relating the power level of the electrical load power to a corresponding loss of power in the electrical load driver, and the determined second voltage.

In a further aspect of the present invention, a power distribution system is presented, wherein the system comprises:
  a power sourcing device for sourcing a power to a powered device,
  a powered device as defined above, and
  an electrical conductor connected to the power sourcing device and the powered device for conveying the sourced power along with data between the power sourcing device and the powered device.

In another aspect of the present invention, a method for providing an electrical load power to an electrical load of a powered device within a system is presented, wherein the method comprises:
  generating from a power sourced by a power sourcing device of the system to the powered device an electrical load power and providing the electrical load power to the electrical load, by an electrical load power providing unit of the powered device, wherein the electrical load power is generated by the electrical load power providing unit with a power level such that an input current drawn by the powered device from the power sourcing device is maximized below a predefined upper input current threshold, allowing the powered device to consume more power than allowed to the powered device according to a negotiated power class.

In a further aspect of the present invention, a computer program for providing an electrical load power to an electrical load of a powered device within a system is presented, wherein the computer program comprises program code means for causing the powered device to carry out the steps of the method as defined above, when the computer program is run on a computer controlling the powered device.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
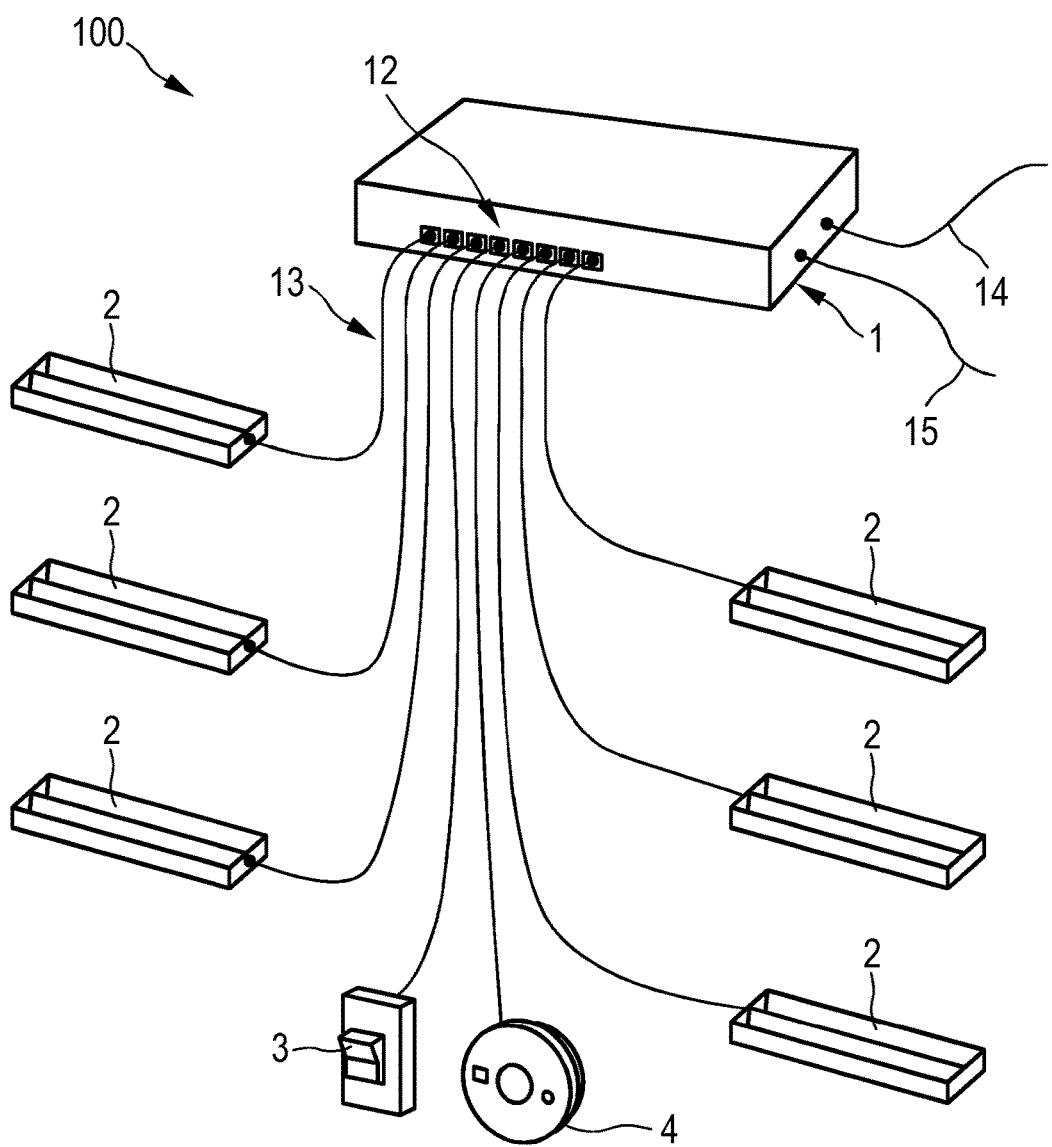
FIG. 1 shows schematically and exemplarily an embodiment of a power distribution system.
Figure 2:
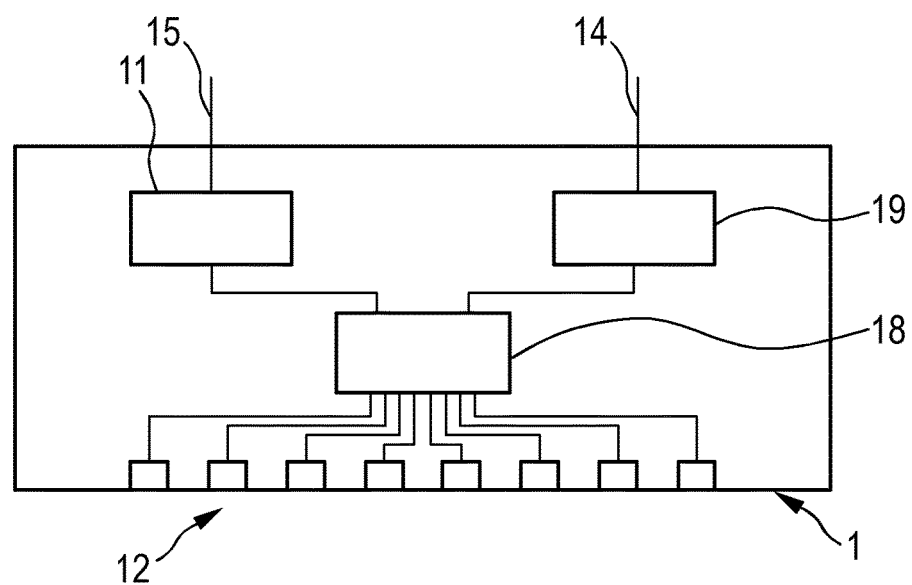
FIG. 2 shows schematically and exemplarily an embodiment of a power sourcing device of the system shown in FIG. 1.

FIG. 1 shows schematically and exemplarily an embodiment of a power distribution system 100 comprising a power sourcing device 1 for sourcing a power to powered devices 2, 3, and 4. In this embodiment, the power distribution system 100 is a PoE system and the power sourcing device 1 is a switch. The power sourcing device 1 is schematically and exemplarily shown in more detail in FIG. 2.

The power sourcing device 1 comprises several ports 12 to which the powered devices 2, 3, and 4 are connected via Ethernet cables 13, which are adapted to convey the sourced power along with data. The power sourcing device 1 receives an input power via an electrical connection 15 that may be directly connected to a mains outlet (not shown in the figure), and the data may be received from another device (not shown in the figure), e.g., another switch, via another Ethernet cable 14. From the received power, a power supply unit 11 generates the power to be sourced to the powered devices 2, 3, and 5 via a power device manager 18. The data may be processed by a network data processor 19 before being sent to a respective powered device 2, 3, or 4 via the power device manager 18.

Figure 3:
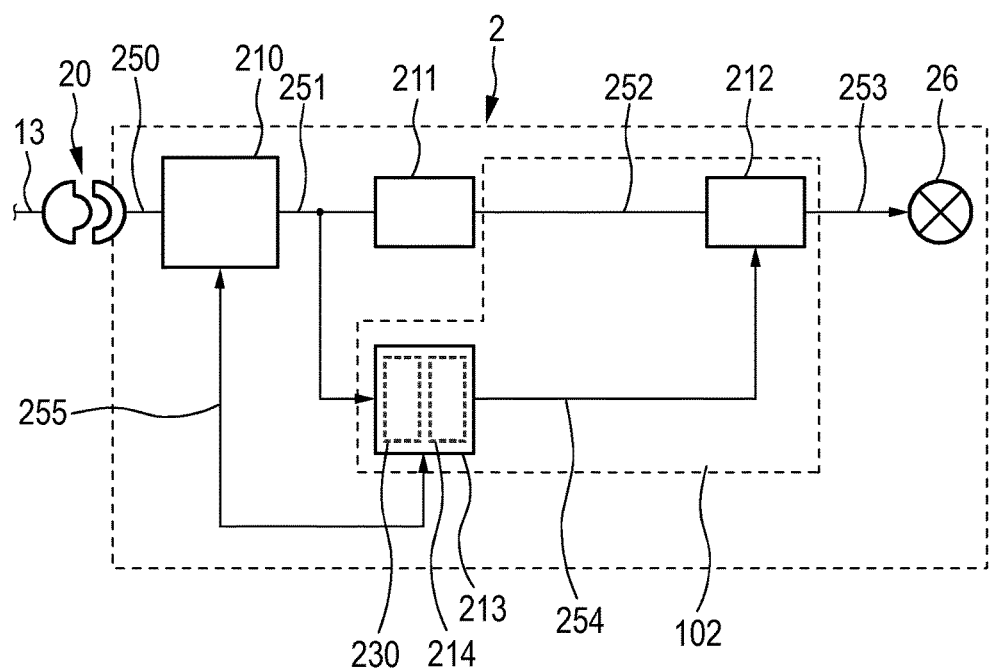
FIG. 3 shows schematically and exemplarily an embodiment of a powered device of the system shown in FIG. 1.

Here, the powered devices 2, 3, and 4 include luminaires 2, a switching element 3, and a presence sensor 4. These can be adapted such that the switching element 3 and/or the presence sensor 4 send dimming commands to the luminaires 2 via the switch 1 after the switching element 3 has been actuated by a person and/or the presence of a person has been detected by the presence sensor 4. A luminaire 2 is schematically and exemplarily shown in more detail in FIG. 3.

The luminaire 2 comprises an electrical load 26, in this embodiment, a light-emitting diode (LED). The luminaire 2 comprises an electrical load power providing unit 102 for generating from the power sourced by the power sourcing unit 1 an electrical load power and for providing the electrical load power to the electrical load 8. According to the present invention, the electrical load power providing unit 102 is adapted to generate the electrical load power with a power level such that an input current drawn by the powered device (2) from the power sourcing device (1) is maximized below a predefined upper input current threshold.

This will be explained in the following in more detail with reference to the PoE standard IEEE 802.3at.

The PoE standard IEEE 802.3at is a very conservative standard with a large number of safety provisions. It is designed to work in just about every conceivable way that CAT3 (Category 3), CAT5 (Category 5), and CAT6 (Category 6) cables and Ethernet are being used globally. This carries a lot of history and backwards compatibility into the standard and also allows for the support of quite "esoteric" usage scenarios. These include, e.g., compatibility with CAT3 cables (which are practically not used anymore for at least 10 years), backwards compatibility with an old AC-based disconnect detection scheme, and compatibility with crossover cables (which are practically irrelevant in end-node connections for at least 5 years).

The present invention addresses the way in which the power consumption is regulated in the PoE standard. In short, a powered device generally requires a certain power level. An input current that is drawn by the powered device from a power sourcing device and that is conveyed via an Ethernet cable to the powered device will cause a voltage drop and, therewith, a loss of power in the cable. The sum of the power required by the powered device and the power lost in the Ethernet cable is the power that the power sourcing device needs to source to the powered device.

Since Ethernet and, thus, PoE support very long cables, e.g., of up to 100 m, and since there is a wide spread in the quality and copper diameter of such cables, the PoE standard supports situations in which large amounts of power are lost in the Ethernet cables. These losses must never make a powered device unable to receive the required power, or, even worse, cause unsafe operation conditions.

The PoE standard allows for a range of voltages to be used as port voltage by the power sourcing device. These are listed in Table 1 below together with other important parameters regarding the power levels defined by the PoE standard IEEE 802.3at. From this table, it can be seen that the port voltage $U_{PSD}$, which must be used by the power sourcing device, is between 50V and 57V and that the powered device must be able to operate correctly with any input voltage $U_{PD}$ between 42.5V and 57V. The difference in the lower limit ($U_{PSD}$=50V vs. $U_{PD}$=42.5V) is to allow for a voltage drop in the Ethernet cable.

TABLE 1

PoE standard IEEE 802.3at - Most important parameters regarding power levels.

| | PSD | | | Cable | PD | | |
|---|---|---|---|---|---|---|---|
| | $U_{PSD}$ (V) | $I_{PSD}$ (A) | $P_{PSD}$ (W) | $P_{reserve}$ (W) | $U_{PD}$ (V) | $I_{PD}$ (A) | $P_{PD}$ (W) |
| Max | 57 | 0.6 | 34.2 | 8.7 | 57 | 0.447 | 25.5 |
| Min | 50 | 0.6 | 30 | 4.5 | 42.5 | 0.6 | 25.5 |

Because the power sourcing device has no means of knowing how large the Ethernet cable losses will be, it must reserve the maximum current corresponding to the negotiated power class. For example, for power class 4, which is the highest power class defined by the PoE standard IEEE 802.3at, this is 0.6 A. The corresponding power reserve $P_{reserve}$ can then be calculated according to the following equation:

$$P_{reserve} = U_{PSD} \cdot I_{PSD} - P_{PD},$$

where $I_{PSD}$ is the maximum reserved current corresponding to the negotiated power class, and $P_{PD}$=25.5 W is the maximum power level allowed by the PoE standard to be required by the powered device (for power class 4). The necessary power reserve $P_{reserve}$ therewith amounts to 4.5 W (at $U_{PSD}$=50V) resp. 8.7 W (at $U_{PSD}$=57V) per port. This actually means that in order to be able to guarantee the provision of the maximum allowed power level of $P_{PD}$=25.5 W to the powered device, the power sourcing device must be able to provide a port power of $P_{PSE}$=34.2 W (assuming that 57V is selected as the port voltage $U_{PSD}$)).

The inventors have realized that, in practice, the power losses occurring in the Ethernet cables are rather limited, even with long cables. Furthermore, it is very unlikely that every powered device is connected with the worst possible cable configuration. Also, it is now found that most power sourcing devices make use of the highest port voltage $U_{PSD}$=57V (or a slightly lower port voltage of, e.g., $U_{PSD}$=56V). Thus, in many situations it would actually be possible for a powered device to consume considerably more power than the 25.5 W allowed by the PoE standard (for power class 4). Allowing for such an increase of power consumption of the powered device could be beneficial in a number of different applications. For example, modern PoE-based lighting applications are at the threshold of having sufficient power with today's LEDs and the 25.5 W power limit. With a slightly higher power level, more lighting applications could be enabled or a significant reduction in cost for the LEDs could be achieved.

In practice, there are several ground rules that are dictated by the PoE standard IEEE 802.3at:
1. The port voltage $U_{PSD}$ used by the power sourcing device must be between 50V and 57V.
2. The power sourcing device must reserve the maximum current $I_{PSD}$ corresponding to the negotiated power class (e.g., 0.6 A for power class 4).
3. The powered device must enforce a power consumption corresponding to (or being below) the maximum allowed power level of, e.g., $P_{PD}$=25.5 W (for power class 4).

Compliance with the first rule is guaranteed by the designer of the power sourcing device, who will select an appropriate power supply unit, and who will test the power sourcing device in different usage scenarios to make sure that under no condition a non-allowed port voltage $U_{PSD}$ is provided.

In addition, observance of the second rule is guaranteed by the port controllers of the power sourcing device, which continuously measure the input current drawn by the powered devices, and which will cut-off a port if the input current drawn by the powered device connected to the port exceeds the maximum current corresponding to the negotiated power class (overcurrent protection). For example, as described above, for power class 4, the maximum current is 0.6 A with the maximum power level $P_{PD}$ allowed by the PoE standard to be required by the powered device being 25.5 W.

The present invention is based on the inventors' realization that a power sourcing device cannot control a power sourcing device's compliance with the third rule and that, if the powered device was to violate the third rule, it could consume more power, provided that it keeps to the maximum current corresponding to the negotiated power class. For example, assuming that a port voltage $U_{PSD}$=57V is used by the power sourcing device and that the voltage drop occurring in the Ethernet cable is more or less negligible—which is indeed roughly the case with modern cables of common length—the maximum power level that could be consumed by the powered device is as high as 34.2 W (see again Table 1).

Now, it has further been realized by the inventors that if a powered device would simply consume more power, the ease of installation associated with modern PoE equipment would be lost, because it would be necessary to define which power sourcing devices are supported by the powered device (which would depend on the port voltage $U_{PSD}$ used by the power sourcing device) and which Ethernet cable types and lengths can be used (which would depend on the voltage drop occurring in the cables). In contrast, the present invention is based on the idea that it would be advantageous if a powered device would be able to automatically consume the maximum power level that can be consumed without causing the overcurrent protection mechanism of the power sourcing device to trip. This should preferentially work automatically and never cause a powered device not to work where another device that complies with the PoE standard IEEE 802.3at would work. In this manner, a powered device could optimize its power consumption in a way that would be compatible to the PoE standard IEEE 802.3at.

Returning now to FIG. 3, the Ethernet cable 13 is connected to a jack 20 of the luminaire 2. The conveyed power along with the data is provided to a power-data splitter 210 via a power-data path 250. The power-data splitter 210 splits the power and the data conveyed by the Ethernet cable 13. The split data is then conveyed further via the data path 255 and the split power is conveyed further via the power path 251. The power-data splitter 210 comprises, e.g., a magnetic circuit for splitting the power and data signals.

The luminaire 2 further comprises a powered device controller 211 for identifying the luminaire 2 in the PoE system and for negotiating a power class with the switch 1. The electrical load power providing unit 102 comprises an electrical load driver 212 for generating from the power sourced by the power sourcing device 1, which is received by the electrical load driver 212 via the powered device controller 211, an electrical load power and for providing the electrical load power to the LED 26, and an electrical load power controller 213 for determining the power level of the electrical load power such that the input current drawn by the powered device 2 from the power sourcing device 1 is maximized below a predefined upper input current threshold, e.g., the 0.6 A defined by the PoE standard 802.3at for power class 4, and for sending a power control signal being indicative of the determined power level via a control signal path 254 to the electrical load driver 212. The electrical load driver 212 is adapted to generate from the sourced power the electrical load power in accordance with the power control signal received from the electrical load power controller 213. The electrical load power is provided from the electrical load driver 212 to the LED 26 via an electrical load power path 253. The electrical load driver 212 is adapted to generate the electrical load power by generating a corresponding electrical load driving current for driving the LED 26. The electrical load power providing unit 102, in particular, the electrical load power controller 213 or the electrical load driver 212 may be adapted to low pass filter the control signal.

In this embodiment, the luminaire 2 comprises a current determining unit 101 (not shown in FIG. 3) for determining a current flowing in the luminaire 2, wherein the electrical load power providing unit 102 is adapted to generate the electrical load power based on the determined current.

Figure 4:
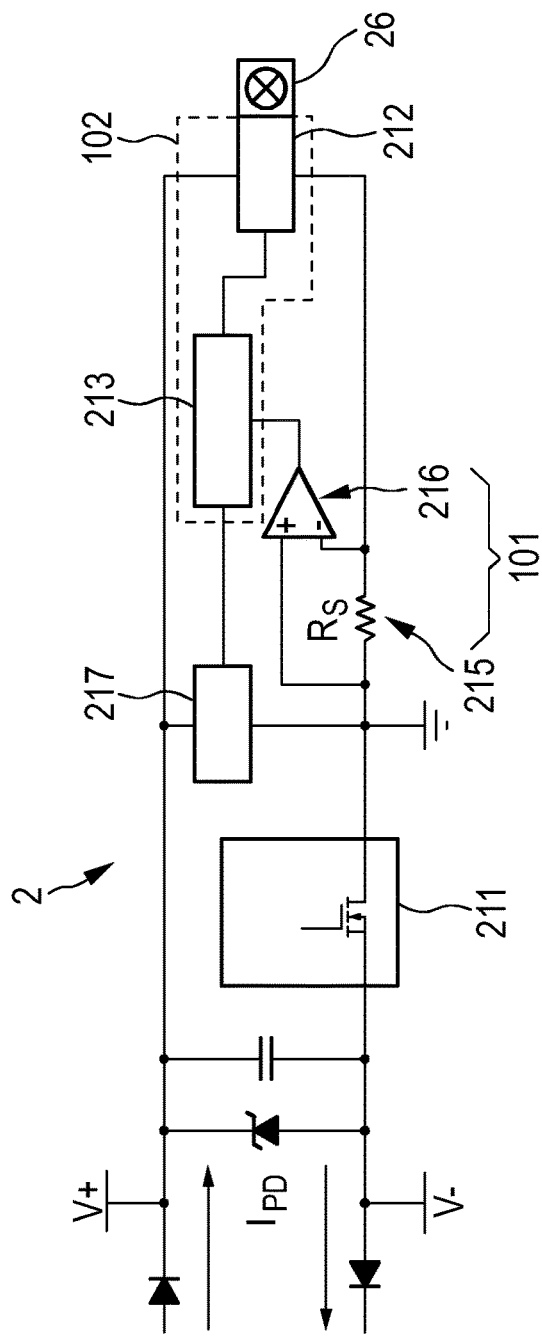
FIG. 4 shows schematically and exemplarily an embodiment of a powered device comprising a current determining unit.

An embodiment of a luminaire 2 comprising a current determining unit 101 is shown schematically and exemplarily in FIG. 4. According to this figure, the current determining unit 101 is adapted to determine the current using a low side current sense which measures the return current from the electrical load driver 212. As the power consumption of the electrical load power controller 213 itself is generally known, the total amount of the input current drawn by the powered device 2 from the power sourcing device 1 can be calculated and the electrical load power providing unit 102 can thus generate the electrical load power with a power level such that the drawn input current is maximized below the predefined upper input current threshold, e.g., 0.6 A. In this example, the current determining unit 101 realizes the low side current sense by means of a resistor 215 (sensing resistor $R_S$), which is installed in the return path from the electrical load driver 212, and an operational amplifier 216, which amplifies the voltage drop occurring at the sensing resistor 215. As further shown in FIG. 4, in this example, the current drawn by the auxiliary power supply 217, which supplies a power to the electrical load power controller 213, is not included in the measurement of the low side current sense, as it is only a small amount of current, which can be compensated for in calculation. This allows for an easier measurement since the operational amplifier 216 can now be connected to a proper ground reference.

As an alternative to the described low side current sense, the current determining unit 101 may also be adapted to determine the current using a high side current sense, which measures the current in the path to the electrical load driver 212. In another alternative, the current determining unit 101 may also comprise a Hall sensor (not shown in the figures) for determining a current flowing in the luminaire 2.

Figure 5:
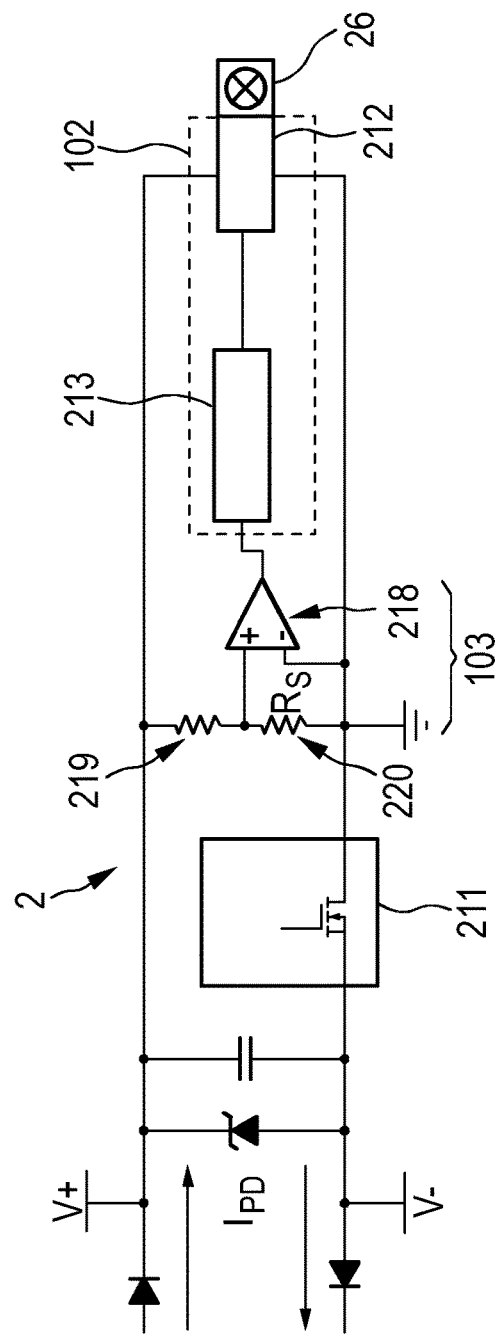
FIG. 5 shows schematically and exemplarily an embodiment of a powered device comprising a voltage determining unit.
Figure 6:
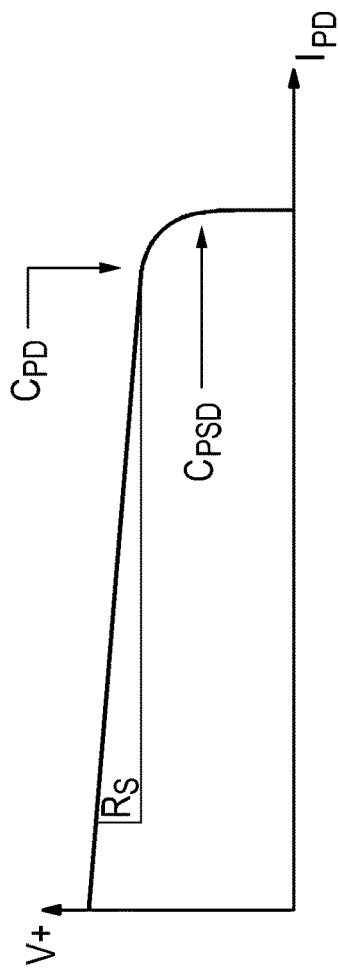
FIG. 6 shows schematically and exemplarily a relationship between an input current drawn by a powered device and a voltage at a powered device.

In another embodiment, shown in FIG. 5, the luminaire 2 may comprise a voltage determining unit 103 (not shown in FIG. 3) for determining a voltage present in the luminaire 2, wherein the electrical load power providing unit 102 is adapted to generate the electrical load power with incrementally increasing power levels until it detects from the determined voltage that the powered device 2 reduces a voltage present at the luminaire 2 in order to protect from an overcurrent. The approach is based on the insight that many powered devices are adapted to gradually reduce the voltage sourced to a powered device when they approach an overcurrent situation, wherein a specific overcurrent threshold, e.g., a value slightly below the 0.6 A defined by the PoE standard 802.3at for power class 4, can generally be set by the designer of the powered device. This behavior is illustrated in FIG. 6, which shows schematically and exemplarily a relationship between an input current $I_{PD}$ drawn by a powered device and a voltage V that is present at a powered device. As can be seen from this figure, when the input current $I_{PD}$ that is drawn by the powered device increases, the voltage V that is present at the powered device decreases in substantially a linear fashion, which is determined by the source impedance $R_S$ (including cables, input diodes, etcetera). However, when the input current $I_{PD}$ approaches an overcurrent situation, the powered device reduces the voltage present at the powered device in order to protect from an overcurrent. This leads to the strong "break-in" of the voltage V present at the powered device shown on the right side of FIG. 6 (starting at $C_{PD}$, i.e., slightly below the cut-off point $C_{PSD}$ of the power sourcing device). By monitoring for this "break-in" by using a voltage that is determined in the powered device 2, the powered device 2 can make sure that the input current $I_{PD}$ that it draws from the power sourcing device 1 stays closely below or at the predefined upper input current threshold, e.g., the 0.6 A defined by the PoE standard 802.3at for power class 4, thus, avoiding an overcurrent situation. Preferably, the powered device 2 provides some leeway to be able to back out of an overcurrent foldback situation without cutting itself off. Alternatively, if the powered device 2 acts to fast and indeed cuts itself off, it should preferentially have recorded, for each increment, a power generation setting corresponding to the respective power level in a non-volatile memory unit 214 (shown in FIG. 3 exemplarily as an element of the electrical load power controller 213). The electrical load power providing unit 102 should then be further adapted to generate, after a reboot of the powered device 2, the electrical load power with a power generation setting corresponding to a power level that is slightly below the power level that caused the cut-off. In this example, the voltage determining unit 103 is realized by means of a voltage divider comprising two resistors connected in series, i.e., a first resistor 219 and a second resistor 220, and an operational amplifier 217, which amplifies the voltage drop occurring at the second resistor 220 (sensing resistor $R_S$). The voltage divider 102, here, is arranged after the powered device controller 211.

Returning to FIG. 3, in another embodiment, the luminaire 2 comprises a communication unit 230 (shown in FIG. 3 exemplarily as an element of the electrical load power controller 213) for communicating with the power sourcing device 1 via the electrical conductor 13, wherein the communication unit 230 is adapted to request from the power sourcing device 1 an information about the drawn input current, wherein the electrical load power providing unit 102 is adapted to generate the electrical load power based on the requested information. This communication may be performed using protocols such as CDP (Cisco Discovery Protocol), LLDP-MED (Logical Link Device Protocol-for Media Endpoint Devices) or SNMP (Simple Network Management Protocol).

In another embodiment, the electrical load power providing unit 102 is adapted to generate the electrical load power with incrementally increasing power levels and to record, for each increment, a power generation setting corresponding to the respective power level in a non-volatile memory unit 214 (shown in FIG. 3 exemplarily as an element of the electrical load power controller 213) until the powered device 2 is cut-off by the power sourcing device 1 in order to protect from an overcurrent, wherein the electrical load power providing unit 102 is further adapted to generate, after the powered device 2 has been restarted in reaction to the cut-off, the electrical load power with a power generation setting corresponding to a power level that is slightly below the power level that caused the cut-off.

Figure 7:
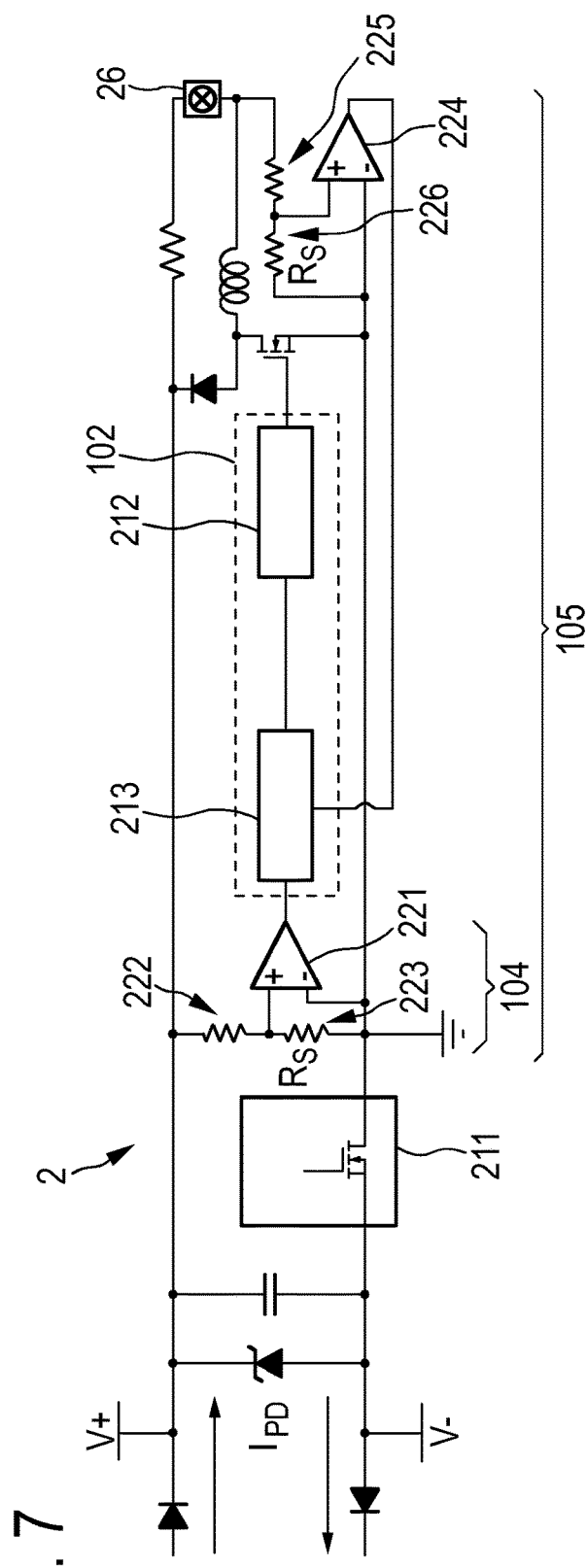
FIG. 7 shows schematically and exemplarily an embodiment of a powered device comprising a first and a second voltage determining unit.

In another embodiment, shown in FIG. 7, the luminaire 2 comprises a first voltage determining unit 104 (not shown in FIG. 3) for determining a first voltage present at the electrical load power providing unit 102, and a second voltage determining unit 105 (also not shown in FIG. 3) for determining a second voltage present at the electrical load 26, here, an LED, wherein the electrical load power providing unit 102 is adapted to generate the electrical load power based on the determined second voltage, a predetermined first information relating the determined second voltage to a corresponding power level of the electrical load power, a predetermined second information relating the power level of the electrical load power to a corresponding loss of power in the electrical load driver 212, and the determined second voltage. The general idea behind this approach is to have a first predetermined information that relates the voltage present at the LED 26 (resp. LED string) to a corresponding power level of the electrical load power. This first predetermined information may be a U/I diagram or the like, from which the power level of the electrical load power can be derived when only determining the LED string voltage. The second predetermined information then relates the power level of the electrical load power to a corresponding loss of power in the electrical load driver 212, i.e., a loss of power that occurs when the electrical load driver 212 generates the electrical load power with the power level corresponding to the determined LED (string) voltage. With the determined power level of the electrical load power and the determined corresponding loss of power in the electrical load driver 212, the input power for the electrical load driver 212 can then be derived and, using the first voltage present at the electrical load power providing unit 102, the input current drawn by the luminaire 2 can then be determined. In this example, the first voltage determining unit 104 is realized by means of a voltage divider comprising two resistors connected in series, i.e., a first resistor 222 and a second resistor 223, and an operational amplifier 221, which amplifies the voltage drop occurring at the second resistor 223 (sensing resistor $R_S$). The voltage divider 104, here, is arranged after the powered device controller 211. The second voltage determining unit 105 is realized by means of the first voltage determining unit 104 and a further voltage divider comprising two resistors connected in series, i.e., a first resistor 225 and a second resistor 226, and an operational amplifier 224, which amplifies the voltage drop occurring at the second resistor 226 (sensing resistor $R_S$). By means of the first resistor 225 and the second resistor 226 of the further voltage divider and the operational amplifier 224, the voltage present at the electrical load driver 212 can be determined. The LED (string) voltage (second voltage) can then be determined by subtracting from the first voltage, as determined by the first voltage determining unit 104, the voltage present at the electrical load driver 212. It is noted that the resistor arranged in series with the LED is only necessary when not the current to the LED is controlled with the electrical load driver 212, but the voltage. If this resistor is present, its influence has to be included in the above mentioned U/I diagram.

The embodiments described above with reference to FIGS. 5 to 7 have the advantage that they do not require any current sensing, which might be desirable for cost reasons. Moreover, both methods preferentially only measure voltages referenced to ground and this can easily be achieved by a standard microcontroller with analog inputs.

In another embodiment, it may also be possible to directly measure the current flowing in the electrical load 26, which, in turn, allows to calculate the power level of the electrical load power, which, in turn, allows to estimate the power drawn from the power sourcing device 1, which, in turn, allows to determine the input current drawn from the power sourcing device 1 when the voltage present at the electrical load power providing unit 102 is known, e.g., when it is determined as described with reference to FIG. 5 or 7 above.

Figure 8:
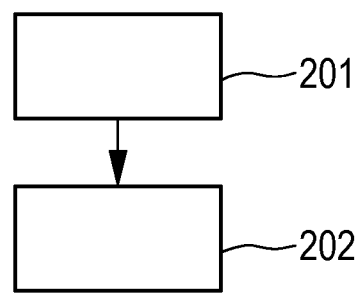
FIG. 8 shows a flowchart exemplarily illustrating an embodiment of a method for providing an electrical load power to an electrical load of a powered device within a power distribution system.

In the following, an embodiment of a method for providing an electrical load power to an electrical load 26 of a powered device 2 within a power distribution system 100 will exemplarily be described with reference to a flowchart shown in FIG. 8.

During sourcing of a power to the powered device 2 by a power sourcing device 1 of the system 100, in step 201 an electrical load power is generated from the sourced power by an electrical load power providing unit 102 of the powered device 2, wherein the electrical load power is generated by the electrical load power providing unit 102 with a power level such that an input current drawn by the powered device 2 from the power sourcing device 1 of the system 100 is maximized below a predefined upper input current threshold. In step 202 the electrical load power providing unit 102 provides the generated electrical load power to the electrical load 26.

Although in the embodiment described above with reference to FIG. 3 the electrical load power controller 213 determines the power level of the electrical load power such that the drawn input current is maximized below the predefined upper input current threshold, in other embodiments also other components of the powered device can provide this function. For instance, this power level control can be implemented in the powered device controller 211, which may already comprise suitable analog circuitry. For providing the power level setting function the respective component of the powered device can use a microcontroller or another kind of controller.

The electrical load power providing unit of the powered device can be used to seamlessly extend the PoE standard IEEE 802.3at and/or the PoE standard IEEE 802.3af in order to boost the maximum power level of powered devices. For example, as described above, assuming that a port voltage $U_{PSD}=57V$ is used by a power sourcing device and that the voltage drop occurring in the Ethernet cable is more or less negligible, the maximum power level that can be consumed by a powered device by extending the PoE standard IEEE 802.3at is as high as 34.2 W (see again Table 1) when the drawn input current is maximized below a predefined upper input current threshold of 0.6 A, i.e., the maximum current corresponding to power class 4. It is, however, to be noted that the present invention is not limited to one or more of the above PoE standards, but may advantageously also be used within other power distribution systems that have similar characteristics.

Although above certain configurations of the powered device have been described, in other embodiment the powered device can also be configured in another way such that the electrical load power is generated with a power level such that the input current drawn by the powered device from the power sourcing device is maximized below the predefined upper input current threshold.

Although in above described embodiments certain powered devices like luminaires, presence sensors, switching elements, et cetera have been described, in other embodiments the powered devices can also include other electrical devices like fans, user interfaces such as displays or switch panels, et cetera.

Although in the embodiment described above with reference to FIG. 3 the jack 20 and the power-data splitter 210 are separate components, in another embodiment the power-data splitter 210 may be integrated into the jack 20.

Although in the embodiment described above with reference to FIG. 3 the electrical load 26 comprised by the luminaire 2 is a light-emitting diode (LED), in another embodiment the electrical load 26 may be an organic light-emitting diode (OLED), a laser, a halogen lamp or the like.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of the power level of the electrical load power, the negotiation procedures, et cetera performed by one or several units or devices can be performed by any other number of units or devices. The procedures and/or the control of the powered device in accordance with the method for providing an electrical load power to an electrical load of the powered device within the power distribution system can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a powered device like a luminaire for being used in a power distribution system, which is preferentially a PoE system and which comprises a power sourcing device for sourcing a power to the powered device. The powered device comprises an electrical load like an LED and an electrical load power providing unit for generating from the sourced power an electrical load power and for providing the electrical load power to the electrical load, wherein the electrical load power providing unit is adapted to generate the electrical load power with a power level such that an input current drawn by the powered device from the power sourcing device is maximized below a predefined upper input current threshold. This allows increasing the power consumption of the powered device in comparison to the power consumption of powered devices in accordance with the PoE standard IEEE 802.3at.

The invention claimed is:

1. A powered device for being used in a power distribution system, the system comprising a power sourcing device for sourcing a power to the powered device and an electrical conductor connected to the power sourcing device and the powered device for conveying the sourced power along with data between the power sourcing device and the powered device, wherein the powered device comprises:

an electrical load; and
an electrical load power providing unit for generating from the sourced power an electrical load power and for providing the electrical load power to the electrical load,
wherein the electrical load power providing unit is adapted to generate the electrical load power with a power level such that an input current drawn by the powered device from the power sourcing device is maximized below a predefined upper input current threshold, allowing the powered device to consume more power than allowed to the powered device according to a negotiated power class,
wherein the electrical load power providing unit is adapted to generate the electrical load power with incrementally increasing power levels until the powered device is cut-off by the power sourcing device, wherein the electrical load power providing unit is further adapted to generate the electrical load power with a particular power generation setting corresponding to a power level that is below the power level that caused the cut-off.

2. The powered device as defined in claim 1, wherein the powered device further comprises:
a current determining unit for determining a current flowing in the powered device,
wherein the electrical load power providing unit is adapted to generate the electrical load power based on determined current.

3. The powered device as defined in claim 2, wherein the current determining unit is adapted to determine the current using a low side current sense or a high side current sense.

4. The powered device as defined in claim 2, wherein the current determining unit comprises a Hall effect sensor for determining the current.

5. The powered device as defined in claim 1, wherein the powered device comprises:
a voltage determining unit for determining a voltage present in the powered device,
wherein the electrical load power providing unit is adapted to generate the electrical load power with incrementally increasing power levels until it detects from the determined voltage that the powered device reduces a voltage present at the powered device in order to protect from an overcurrent.

6. The powered device as defined in claim 1, wherein the powered device further comprises:
a communication unit for communicating with the power sourcing device via the electrical conductor, wherein the communication unit is adapted to receive from the power sourcing device an information about the drawn input current,
wherein the electrical load power providing unit is adapted to generate the electrical load power based on the received information.

7. The powered device as defined in claim 6, wherein the information indicates the drawn input current.

8. The powered device as defined in claim 7, wherein the communication unit is configured to request said information from said power sourcing device.

9. The powered device as defined in claim 1, wherein the electrical load power providing unit is adapted to record, for each increment, a power generation setting corresponding to the respective power level in a non-volatile memory unit until the cut-off by the power sourcing device, wherein the cut-off is performed in order to protect from an overcurrent, wherein the electrical load power providing unit is further adapted to generate the electrical load power with the particular power generation setting after the powered device has been restarted in reaction to the cut-off.

10. The powered device as defined in claim 1, wherein the electrical load power providing unit comprises:
an electrical load driver for generating from the sourced power the electrical load power and for providing the electrical load power to the electrical load, and
an electrical load power controller for determining the power level of the electrical load power such that the drawn input current is maximized below the predefined upper input current threshold and for sending a control signal being indicative of the determined power level to the electrical load driver,
wherein the electrical load driver is adapted to generate the electrical load power from the sourced power in accordance with the control signal.

11. The powered device as defined in claim 10, wherein the powered device comprises:
a first voltage determining unit for determining a first voltage present at the electrical load power providing unit,
a second voltage determining unit for determining a second voltage present at the electrical load,
wherein the electrical load power providing unit is adapted to generate the electrical load power based on the determined second voltage, a predetermined first information relating the determined second voltage to a corresponding power level of the electrical load power, a predetermined second information relating the power level of the electrical load power to a corresponding loss of power in the electrical load driver, and the determined second voltage.

12. The powered device as defined in claim 1, wherein the powered device is a Power-over-Ethernet device.

13. The powered device as defined in claim 1, wherein the electrical conductor is an Ethernet cable.

14. A power distribution system, wherein the system comprises:
a powered device as defined in claim 1;
a power sourcing device for sourcing a power to the powered device; and
an electrical conductor connected to the power sourcing device and the powered device for conveying the sourced power along with data between the power sourcing device and the powered device.

15. The system as defined in claim 14, wherein the system is a Power-over-Ethernet system.

16. A method for providing an electrical load power to an electrical load of a powered device within a system, wherein the method comprises:
generating from a power sourced by a power sourcing device of the system to the powered device an electrical load power and providing the electrical load power to the electrical load, by an electrical load power providing unit of the powered device,
wherein the electrical load power is generated by the electrical load power providing unit with a power level such that an input current drawn by the powered device from the power sourcing device is maximized below a predefined upper input current threshold, allowing the powered device to consume more power than allowed to the powered device according to a negotiated power class,
wherein the generating comprises generating the electrical load power with incrementally increasing power levels until the powered device is cut-off by the power sourcing device, and generating the electrical load power with a particular power generation setting corresponding to a power level that is below the power level that caused the cut-off.

17. A non-transitory computer readable medium comprising a computer program of instructions that, when executed by a processor, causes a powered device to perform the method of claim 16.

\* \* \* \* \*